Patented July 28, 1931

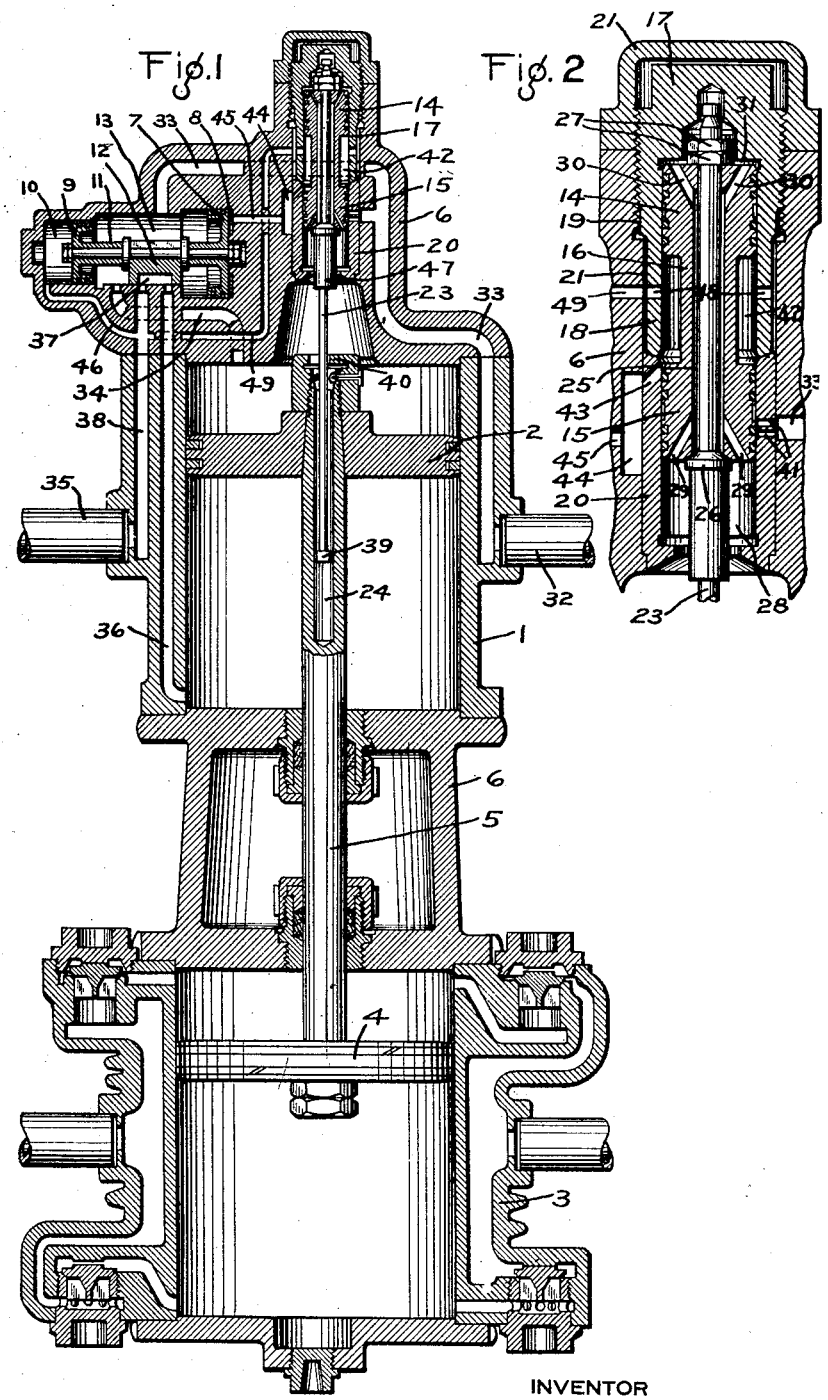

1,816,098

UNITED STATES PATENT OFFICE

BENJAMIN H. THOMPSON, OF ARDARA, PENNSYLVANIA, ASSIGNOR TO THE WESTINGHOUSE AIR BRAKE COMPANY, OF WILMERDING, PENNSYLVANIA, A CORPORATION OF PENNSYLVANIA

STEAM DRIVEN FLUID COMPRESSOR

Application filed February 24, 1930. Serial No. 430,509.

This invention relates to fluid compressors, and more particularly to a fluid compressor of the type employed on locomotives in steam railway service.

The locomotive type of fluid compressor comprises a main valve device for controlling the admission of steam to and its exhaust from the steam cylinders of the compressor, a reversing valve for controlling the operation of the main valve device, and a reversing rod, operated by the movement of the compressor piston portion, for operating the reversing valve.

The principal object of my invention is to provide an improved reversing valve construction, in which a piston type of reversing valve is employed.

Other objects and advantages will appear in the following more detailed description of the invention.

In the accompanying drawings, Fig. 1 is a sectional view of a fluid compressor with my improved reversing valve construction embodied therein; and Fig. 2 an enlarged sectional view of the reversing valve construction.

The compressor may comprise a steam cylinder 1 containing a steam driven piston 2, an air cylinder 3, containing a fluid compressing piston 4, connected to piston 2 by a piston rod 5, and a center piece 6, to which said cylinders are connected.

Secured to the upper end of the steam cylinder 1 is a valve head 6, containing a main valve device and a reversing valve. The main valve device comprises a large piston 7 contained in piston chamber 8, a small piston 9, contained in piston chamber 10, a stem 11, connecting said pistons, and a slide valve 12 adapted to be operated by said stem and contained in valve chamber 13, intermediate said pistons.

The reversing valve comprises piston heads 14 and 15 connected together by an intermediate portion 16 of reduced diameter, the area of piston 15 being slightly greater than the area of piston 14. The piston head 14 reciprocates in a bushing 17, having a threaded portion adapted for screw-threaded engagement in the valve head, a portion 18 of reduced diameter, and a portion 19 intermediate the threaded portion and the portion 18 of a diameter slightly less than the inside diameter of the threads in the valve head.

The piston head 15 reciprocates in a bushing 20, having a concave conical end which is engaged by a convex conical end of the bushing 17, so that when the bushing 17 is forced against the bushing 20, the bushings will be self centered. The angle of the conical ends is sufficiently abrupt to prevent distortion when the bushings are pressed together.

In assembling the bushings, the bushing 20 is first installed, and then the bushing 17. The portion 18 is of such length that it will enter the annular space 21, before the portion 19 enters the threaded portion of the valve head 6, so that jamming is prevented. The portion 19 then acts as a guide to center the bushing. A cap 22, having interior screw threads, is applied to the threaded portion of the bushing 17, after the bushings have been installed.

A reversing rod 23 extends into a bore 24 of the piston rod 5 and also extends through a bore 25 in the reversing valve. Said rod is provided with a conical flange 26, adapted to engage in a conical depression formed at the lower end of the reversing valve, and the rod is secured to the valve by means of nuts 27.

The chamber 28 below the reversing valve is open to the piston chamber above the steam piston 2. Passages 29 in the piston head 15 connect chamber 28 with the bore 25, and passages 30 connect the bore 25 with chamber 31 above the piston head 14, so that steam pressure above the piston 2 acts in chamber 31 on piston head 14, as well as on the piston 15. The piston head 15 being of slightly greater area than the piston head 14, there is provided a slight difference in pressure, tending to maintain the reversing valve against downward movement by gravity.

In operation, steam is supplied from steam supply pipe 32, through passage 33 to valve chamber 13, and with the main valve 12 in the position shown in the drawings, steam is supplied from valve chamber 13, through passage 34 to the piston chamber above piston 2. The piston chamber below piston 2 is connected to the exhaust steam pipe 35, through passage 36, cavity 37 in valve 12, and passage 38. The piston 2 is therefore moved downwardly to operate the fluid compressing piston 4.

When the piston 2 nears the end of its stroke, the button 39 on the reversing rod 23 engages a striker plate 40, and then the reversing valve is pulled down by the rod. The bushing 20 is provided with two or more ports 41 which lead to the steam supply passage 33, and downward movement of piston head 15 operates to uncover said ports, so that steam is admitted to the annular chamber 42. From chamber 42, steam is supplied through passage 43 to chamber 44, which is connected to piston chamber 8, through passage 45.

Piston chamber 10 is open to the exhaust at all times, through passage 46, which leads to exhaust passage 38, and the steam pressure in valve chamber 13 tends to shift the piston 7 toward the right, due to the differential areas of pistons 9 and 7, but when steam is admitted to piston chamber 8, this differential pressure is overcome, and the pistons are shifted to the left.

In this position, passage 36 is uncovered by the movement of the main valve 12, so that steam is supplied from valve chamber 13 to the piston chamber below piston 2, while passage 34 is connected through cavity 37 with exhaust passage 38, so that the piston chamber above piston 2 is connected to the exhaust. The piston 2 is then moved upwardly.

When the piston 2 approaches the end of its upper stroke, the plate 40 engages a shoulder 47 on the reversing rod 23, and said rod is then shifted upwardly, moving the reversing valve so as to close the steam supply ports 41 by the movement of piston head 15. The upper movement of piston head 14 uncovers ports 48 in the bushing 17 and the annular space 21 being open to passage 49, leading to exhaust passage 38, the piston chamber 8, which is connected to chamber 42 through passage 43, is vented to the atmosphere.

Steam being thus exhausted from piston chamber 8, the steam pressure in valve chamber 13, acting on the differential area of piston 7, shifts the main valve parts to the position shown in the drawings, in which position, as before described, steam is admitted to the piston chamber above piston 2, while steam is exhausted from the piston chamber below said piston.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a steam engine, the combination with a steam driven piston and a valve device for controlling the steam for operating said piston, of a reversing valve mechanism for controlling the operation of said valve device and comprising a casing, having a cylindrical bore connected piston valves, a bushing mounted in said bore and containing one piston valve and having a conical end portion, and a bushing mounted in said bore and containing the other piston valve and having a conical seat on which said conical end engages to thereby insure the alinement of said bushings.

2. A reversing valve construction for a steam engine comprising a casing having a cylindrical bore, a reversing valve having two piston heads, and two bushings mounted in said bore, each containing one of said piston heads, one bushing having a conical end adapted to engage a corresponding conical seat at one end of the other bushing and means for pressing said ends together to thereby ensure alinement of the bushings.

3. A reversing valve construction for a steam engine comprising a casing, a reversing valve having two piston heads, and a bushing in which each piston head reciprocates, one bushing having screw-threaded engagement in said casing and having an annular extended portion with an anular portion of larger diameter intermediate the threaded portion and the extended portion, the casing having a bore slightly larger than the annular extended portion, with which said extended portion engages before the intermediate portion engages in the threaded portion of the casing, in assembling the bushing in the casing.

4. A reversing valve construction for a steam engine comprising a casing having a bore, one portion of which is interiorly threaded and another portion of which is of smaller diameter than the inner diameter of the threaded portion, a bushing having a threaded portion for engagement with the threaded portion of the casing and having an annular extended portion with an annular portion intermediate the threaded portion and the extended portion, the annular extended portion being adapted to engage in the portion of the bore of the casing having the smaller diameter, and a reversing valve having a piston head adapted to reciprocate in said bushing.

In testimony whereof I have hereunto set my hand, this 20th day of February, 1930.

BENJAMIN H. THOMPSON.